United States Patent [19]

Pérez C.

[11] Patent Number: 5,390,899
[45] Date of Patent: Feb. 21, 1995

[54] FLOW VALVE OPERATED BY THE ANGULAR OR CROSS DISPLACEMENT OF AN AXIAL STEM

[76] Inventor: Sergio Pérez C., Estado 235, of., 511 Santiago, Chile

[21] Appl. No.: 100,946

[22] Filed: Aug. 3, 1993

[30] Foreign Application Priority Data

Oct. 26, 1992 [CL] Chile .................... 1204-92

[51] Int. Cl.⁶ .................... F16K 39/00; F16K 11/14
[52] U.S. Cl. .................... 251/339; 251/354; 137/862
[58] Field of Search .............. 251/339, 342, 354, 297; 137/862

[56] References Cited

U.S. PATENT DOCUMENTS

| | | | |
|---|---|---|---|
| 2,709,111 | 5/1955 | Green | 251/354 |
| 2,847,028 | 8/1958 | Ross | 137/867 |
| 4,403,570 | 9/1983 | Freehafer | 119/72.5 |
| 4,586,464 | 5/1986 | Agerley et al. | 119/72.5 |
| 4,824,075 | 4/1989 | Holzboog | 251/354 |

FOREIGN PATENT DOCUMENTS

| | | | |
|---|---|---|---|
| 1228201 | 8/1960 | France | 251/339 |
| 815880 | 8/1951 | Germany | 251/342 |

Primary Examiner—A. Michael Chambers
Attorney, Agent, or Firm—Shlesinger Arkwright & Garvey

[57] ABSTRACT

A valve for controlling fluid flow comprises a body having an inlet and an outlet, the body having an opening at one end; a controlling stem disposed axially of the body with one end portion extending through the body opening, the stem being pivotable about the body opening between a normal position when the valve is closed and a pivoted position when the valve is open; and a first elastic ring disposed within the body in sealing contact with the stem and disposed between with the inlet and the outlet, thereby to prevent fluid flow from the inlet to the outlet. The stem when in the pivoted position being adapted to deform the first elastic ring to create an opening between the stem and the first elastic ring, thereby to permit fluid to flow from the inlet through the opening to the outlet.

16 Claims, 5 Drawing Sheets

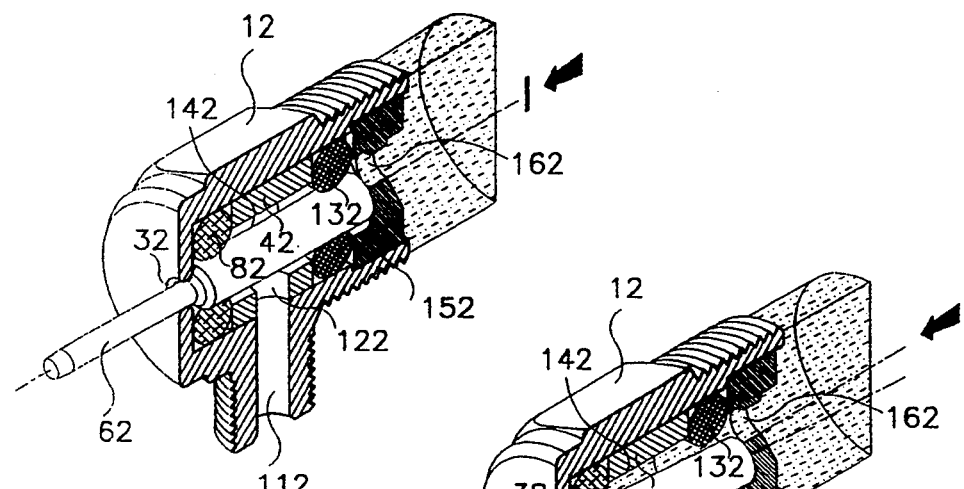
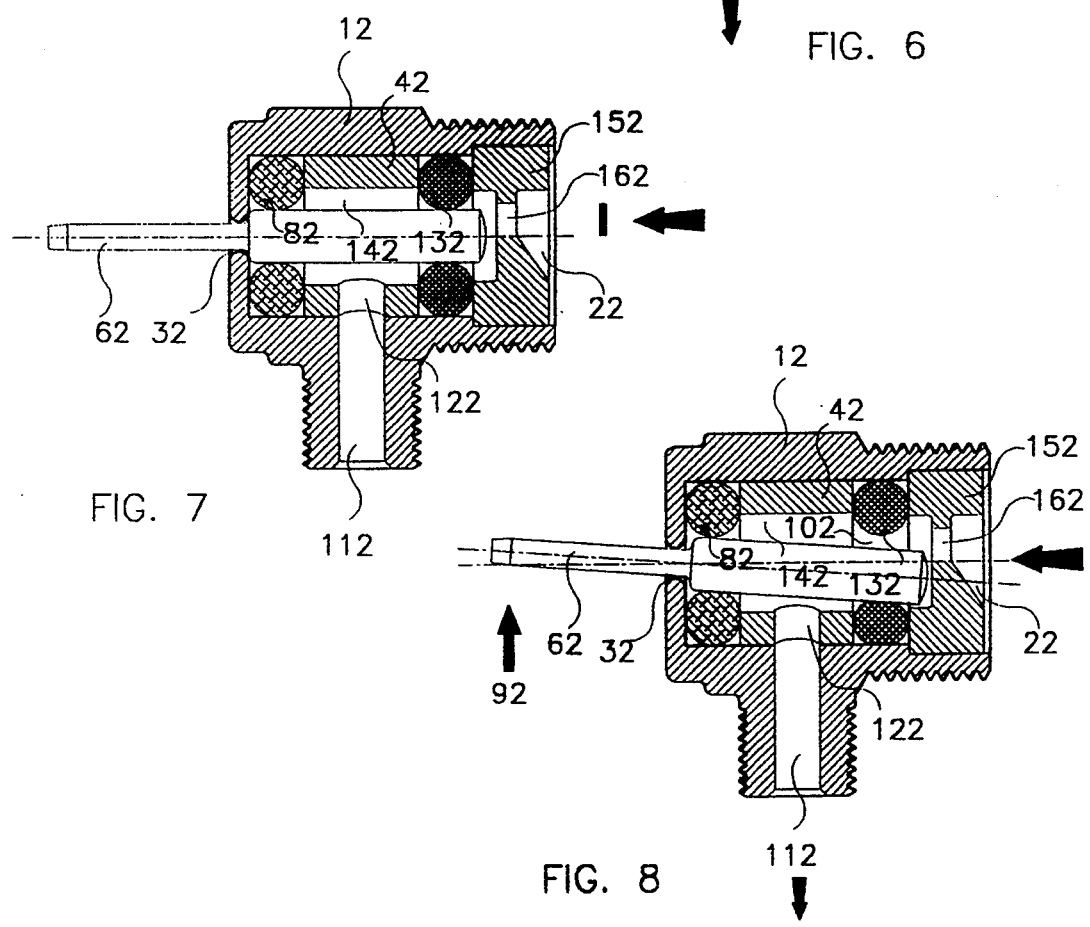

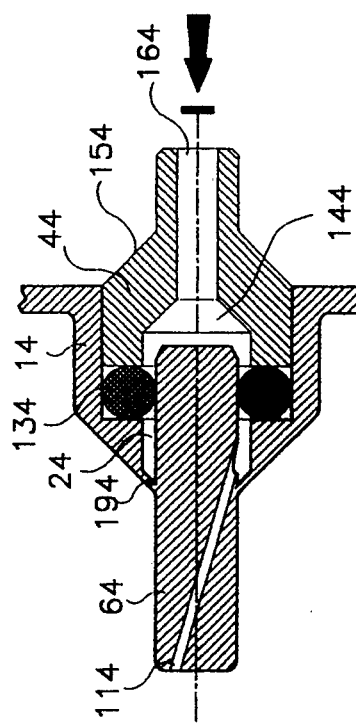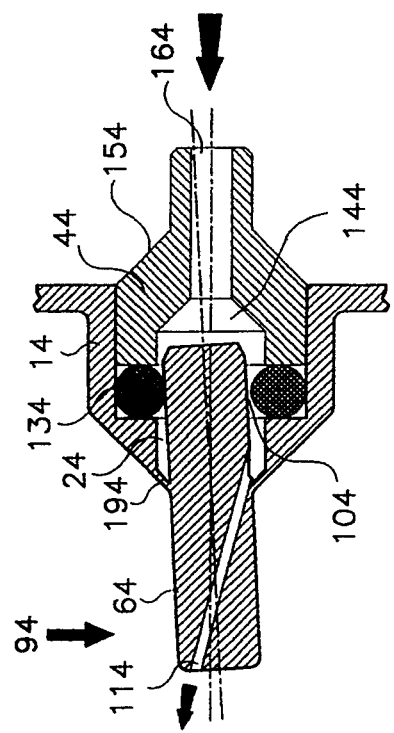
FIG. 11
FIG. 12
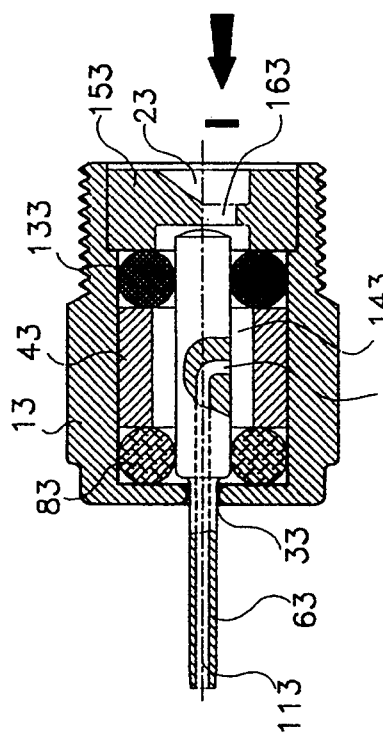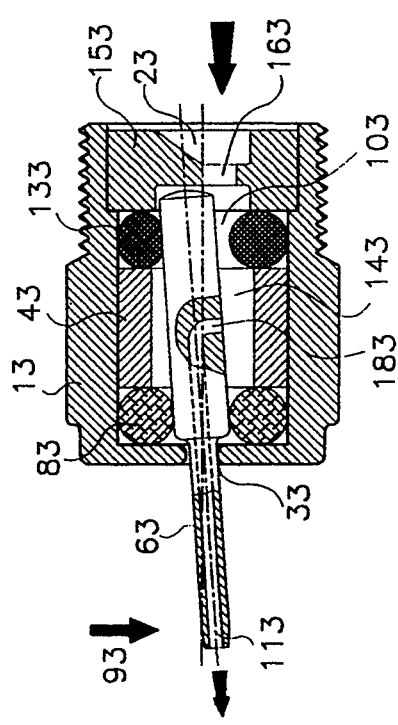
FIG. 9
FIG. 10

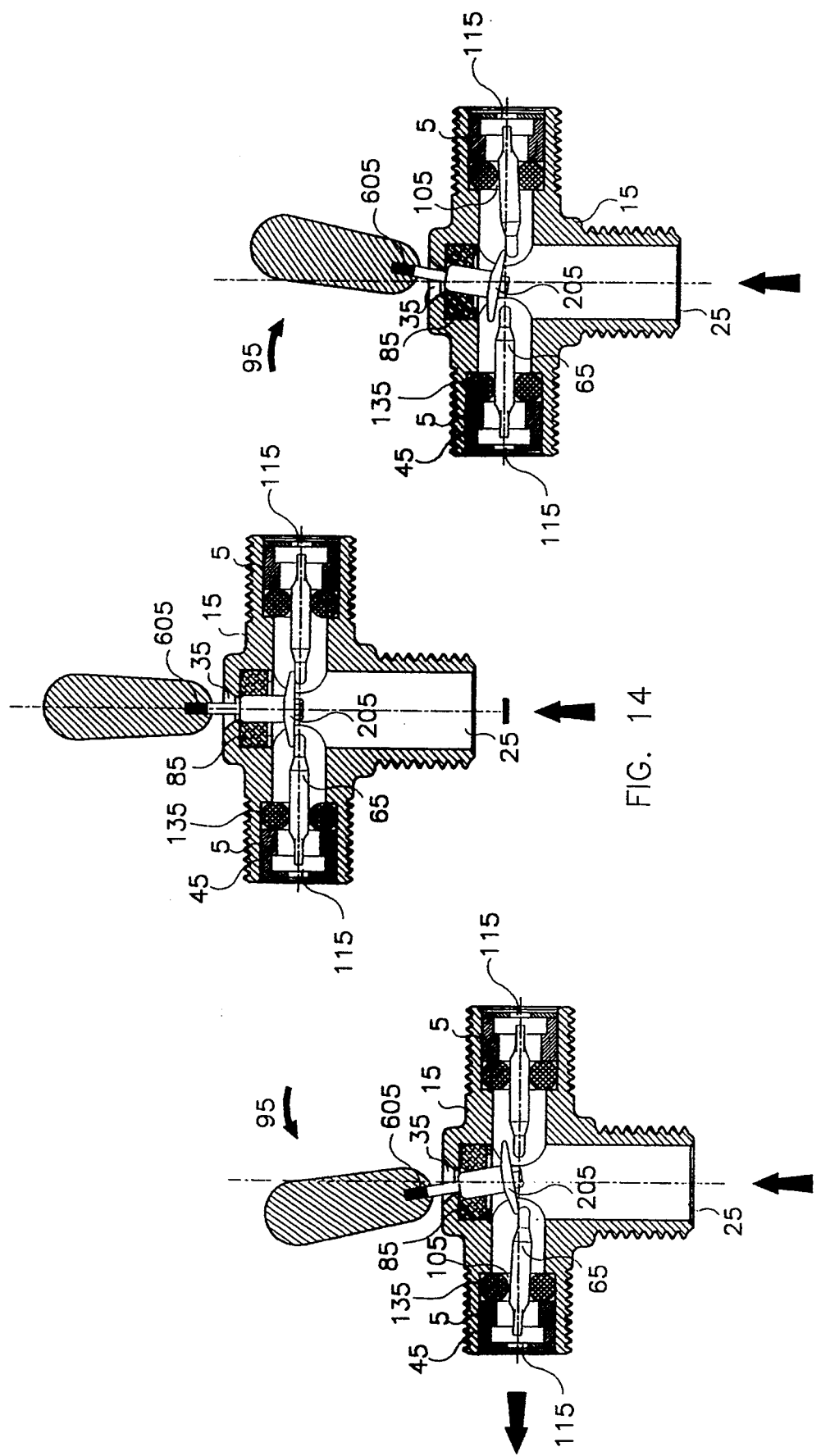

FLOW VALVE OPERATED BY THE ANGULAR OR CROSS DISPLACEMENT OF AN AXIAL STEM

BACKGROUND OF THE INVENTION

1. Field of the Invention

The invention is concerned with flow valves operated by the angular displacement of a controlling stem.

These valves may be applied, among other area& to the control of flows, especially to the control of one or more flow lines, such as water lines, through little deflections of the controlling stem, in hand washbasins where cold and warm water must be mixed, for example, as well as in the automatic control of mechanisms, etc.

2. Description of the Related Art

A number of valves is well known based—the same as the invention—on a substantially cylindrical body with a flow inlet and a flow outlet, containing a flow sealing element associated with a controlling stem, which—once angularity deflected—produces a flow passing port in the side opposing to the stem pin.

Some of these valves are those described in U.S. Pat. No. 3,698,685, Lang; U.S. Pat. No. 4,320,891, Cairns; U.S. Pat. No. 4,403,570, Freehafer; and U.S. Pat. No. 4,586,464, Agerrley et al. In all these valves, the controlling stem is surrounded by a sealing ring near its inner end and said sealing ring is axially compressed in a lateral portion, a port being thus generated in the totally opposed portion, through which the flow runs in a substantially axial direction to the controlling stem.

This kind of valves is limited to small pressures in the network due to the low sensitivity of the controlling stem. In fact, due to its structure, the network pressure exerts a great force in the stem face located inside the valve body, thus making it necessary a proportionally greater force in the stem in order to control the valve. This disadvantage is even bigger in the designs of the previous art, in which additional axial compression elements are available, such as elastomeric springs or stems.

Another disadvantage of these valves is their little versatility, in the sense that they do not allow the pass of a flow once the deflection action in the controlling stem ends.

Even another disadvantage of these valves is that they may not be used in application requiting inner discharge, that is, these valves are solely destined to discharge the flow through the same opening in which the controlling stem is located, thus pouring the flow coaxially to it.

SUMMARY OF THE INVENTION

The invention offers a valve that may be operated by the angular displacement of a controlling stem, with respect to the stem which overcomes the disadvantages of the valves of the previous technique.

Valves which are the subject matter of this invention in general consist in a valve body with a substantially cylindrical axial hole or inlet having a forward narrowing or opening in one of their ends. In the inner wall of the axial hole there is a tight riling-shaped butt, where a controlling stem is located axially oriented to the valve body. This controlling stem projects outside the valve body through the forward opening or narrowing of the axial hole. An elastic ring is available in radial contact with the forward part of the controlling stem located inside the valve body.

A group of modalities of the valve which is the subject matter of this invention is generated when completing the valve with preset addressing devices of the angular displacement of the controlling stem (or cross with respect to the controlling stem). These devices may consist in defining the geometry of the forward opening of the oblong or star shaped valve, for example.

An additional group of modalities of the valve which is the subject matter of this invention considers the including of locking devices for the controlling stem in order to keep the passing of flow once the deflection action of the controlling stem ends.

Another group of modalities of the valve which is the subject matter of this invention is obtained by obstructing the forward opening or narrowing of the valve body through a membrane shaped in the same body, which joins to the controlling stem, thus forming the assembly of valve body, membrane and controlling stem, a single mono-block part allowing the swiveling of said controlling stem. Additionally, the controlling stem is equipped with a hole communicating its outside portion with the inner side of the valve.

Even another group of modalities of the valve which is the subject matter of this invention consists in a multiple or compound valve having one flow inlet and a number of outlets. This kind of multiple valve is made up of an array of several valves of the modalities already mentioned, which are selectively operated through an axial or main stem controlling the control stems of the array valves, thus allowing the switching of the flow inlet to any outlet.

Valves which are the subject matter of this invention are more compact, since they are made up of a lower number of elements, these being simpler than those of the traditional valves.

A second kind of advantages of the valves which are the subject matter of this invention is their greater sensitivity, requiring lower driving forces for the stem, even though the flow line is subject to great pressures, as compared with the previous valves.

A third kind of valves which are the subject matter of this invention, relates to their versatility in the applications, being able to admit designs allowing an alternative flow outlet to several distribution ducts; continuous outlet; timed outlet; in addition to the option between external or inner discharge to the valve, that is, the flow outlet—as in the traditional valves—follows the direction of the controlling stem, or the latter acts alone to deviate the flow to the outlet duct which is not located in the periphery to said stem.

BRIEF DESCRIPTION OF DRAWINGS

The advantages already mentioned shall be clearly deduced from the detailed disclosure of the invention supported by drawings, where:

FIG. 5 shows an isometric perspective in a longitudinal section of a second modality of the invention, in which the valve is closed.

FIG. 6 shows an isometric perspective in a longitudinal section of the modality of FIG. 5, in which the valve is opened.

FIG. 7 depicts a raised plan in a longitudinal section corresponding to the second modality of this invention with the valve closed equal to the condition of FIG. 5.

FIG. 8 depicts a raised plan in a longitudinal section corresponding to the modalities of FIGS. 5 to 7, with the valve opened equal to the condition of FIG. 6.

FIG. 9 shows a raised plan in a longitudinal section of a third modality of the invention, in which the valve is closed.

FIG. 10 shows a raised plan in a longitudinal section of the third modality of the invention, in which the valve is opened.

FIG. 11 shows a raised plan in a longitudinal section of a fourth modality of the invention in a closed condition.

FIG. 12 is a raised plan in a longitudinal section of the same modality of FIG. 11 in an opened condition.

FIG. 13 shows a raised plan in a longitudinal section of a fifth modality of the invention, where the compound valve may be seen closed to the right outlet and opened to the left outlet.

FIG. 14 is a raised plan in a longitudinal section of the same modality of FIG. 13 with the compound valve closed.

FIG. 15 shows a raised plan in a longitudinal section of a fifth modality of the invention, where the compound valve may be seen closed to the left outlet and opened to the right outlet.

DETAILED DESCRIPTION OF INVENTION

Figure 1:
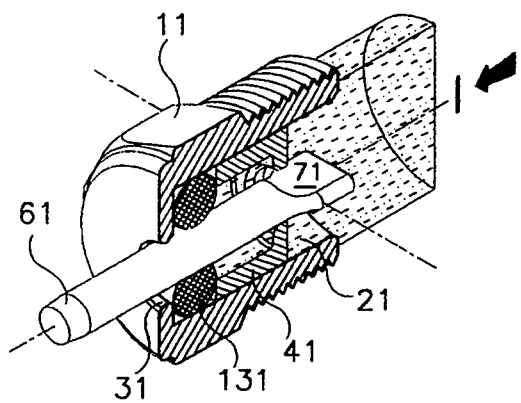
FIG. 1 shows an isometric perspective in a longitudinal section of the first modality of the invention, in which the valve is closed.

FIGS. 1 to 4 show a first modality of valve according to the invention. This valve is made up of a valve body 11 with a substantially cylindrical axial hole 21, with a narrowing 31 in the forward end.

There is a ring-shaped butt 41 concentric and tight to the axial hole 21, the rear end of which opposed to narrowing 31 of the valve body 11 having a throat 161.

Axially to the valve body 11, there is a controlling stem 61, so that the forward end projects through narrowing 31 of the valve body 11, the diameter of said controlling stem 61 being substantially lower than the diameter of said narrowing 31. The other end of the controlling stem 61 goes beyond the throat 161 of the ring-shaped butt, said end having pivotal means, such a flattening or terminal boss 71.

Between the inner forward part of the valve body 11 and the forward part of the ring-shaped butt 41, a ring-shaped chamber is defined acting as seat for an elastic ring 131, which is radially adjusted to the controlling stem 61.

Figure 2:
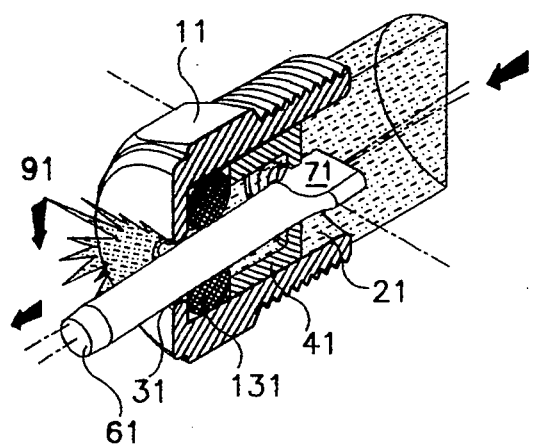
FIG. 2 shows an isometric perspective in a longitudinal section of the modality shown in FIG. 1, in which the valve is opened.
Figure 3:
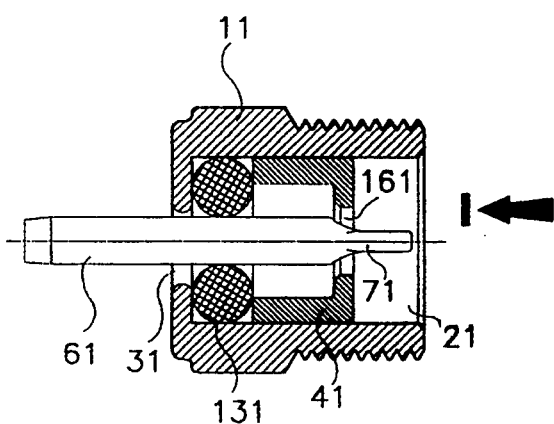
FIG. 3 depicts a raised plan in a longitudinal section corresponding to the first modality of this invention with the valve closed equal to the condition of FIG. 1.

FIGS. 1 to 3 depict the first modality of the valve in closed condition. The valve inlet is located in its rear part (fight end). Flow enters the valve body through the throat 161 of the ring-shaped butt 41, being hold back there due to the watertightness achieved by the elastic ring 131, which is in radial contact with the controlling stem 61.

Figure 4:
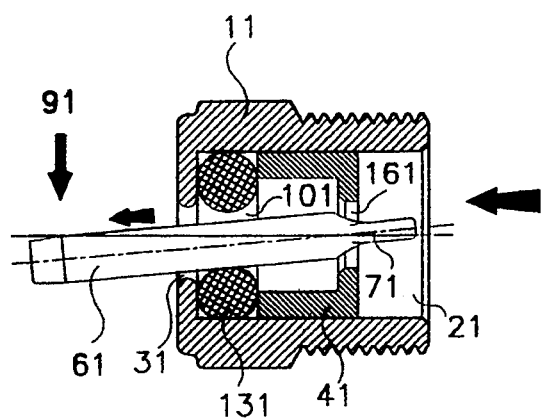
FIG. 4 depicts a raised plan in a longitudinal section corresponding to the modalities of FIGS. 1 to 3, with the valve opened equal to the condition of FIG. 2.

As shown in FIGS. 2 and 4, when a cross force to the controlling stem 61 (arrow 91) is exerted, said stem swivels around throat 161 of the ring-shaped butt 41 and radially compresses a portion of the elastic ring 131, generating an outlet port 101 totally opposed to the compressed portion of said elastic ring 131 through which the flow runs.

Once the force destabilizing the controlling stem 61 (arrow 91) ceases, and due to the resilient nature of the elastic ring 131, its compressed portion exerts a radial force in the controlling stem 61, the axial position being reestablished until reaching a full contact with said elastic ring 131, the valve becoming closed and assuming the same condition depicted in FIGS. 1 and 3.

As already shown, this first modality of valve is of the kind with a flow outlet coaxially to the controlling stem, which opens while said controlling stem is angularly displaced by the action of some cross force. Once the destabilizing force has ceased, the valve automatically closes.

The second modality of the valve, according to the invention, is depicted in FIGS. 5 to 8. The valve is made up of a valve body 12 having an axial hole 22 and a cross outlet duct or hole 112. The axial hole 22 completely crosses the valve body 12, while the cross outlet duct 112 abuts upon to said axial hole 22, preferably under the form of a bypass.

The axial hole 22 is substantially cylindrical with a narrowing 32 in its forward end.

There is a ring-shaped butt 42 concentric and tight to the axial hole 22 with a cross opening 122 corresponding to the intersection zone between the cross outlet duct 112 and the axial hole 22 of the valve body 12.

Axially to the valve body 12, there is a controlling stem 62, so that the forward end projects tightly through narrowing 32 of the valve body 12.

The diameter of said portion of the controlling stem 62 inside the valve is a little greater than the diameter of the portion passing through narrowing 32, but lower than the inner diameter of the ring-shaped butt 42, a flow distribution chamber 142 being thus defined and released by the cross hole 122 of the ring-shaped butt 42. Alternatively, a controlling stem with a substantially uniform diameter in its whole length may be considered, but equipped with ribs in its inner zone with respect to the valve, so that its accidental axial displacement may be avoided.

Between the inner forward part of the valve body 12 and the forward part of the ring-shaped butt 42, a first ring-shaped chamber is generated acting as seat for a sealing ring 82 (or forward sealing ring), which is radially adjusted to the controlling stem 62. Between the rear part of the ring-shaped butt 42 and a part of the rear butt 152 equipped with an opening 162, elastic in this case a second ring-shaped chamber acting as seat for elastic ring 132 (or rear elastic ring) is generated, which is radially adjusted to the rear end of the controlling stem 62.

FIGS. 5 and 7 depict the second modality of the valve in closed condition with the flow held back in its rear end (right end). The controlling stem is aligned due to the action of a sealing ring 82 and an elastic ring 132, so that chamber 142 remains watertight with respect to the flow inlet. When an angular displacement in the outer end of the controlling stem 42 occurs, by applying a cross force in the sense of the arrow 92 (see FIGS. 6 and 8), for example, then said controlling stem 62 swivels around narrowing 32 of the forward end of the axial hole 22, and the rear end of said controlling stem 62 radially compresses a portion of the rear elastic ring 132, generating a port 102 in its totally opposed portion. The flow enters chamber 142 through this port 102, from which it is exhausted to the cross opening 122 of the ring-shaped butt 42, to be released by the cross outlet duct 112 of valve body 12.

Once the cross force applied to the outer end of the controlling stem 62 (arrow 92) has ceased, the compressed portion of the elastic ring 132 forces said controlling stem 62 to axially align, becoming in full contact with said elastic ring and the valve becoming closed as shown in FIGS. 5 and 7.

Unlike the first modality of the invention, this second modality has inner discharge, that is, the flow outlet is not through the periphery of the controlling stem, but the flow is deviated to an outlet duct, which may be connected to a flow network. This feature allows to use the valve in control applications for flow lines through the controlling stem, without the latter showing leaks outwards.

From its operation point of view, the third modality of the invention consists in a valve in which flow runs through the center of the controlling stem after driving the latter. This third modality is depicted in FIG. 9 (closed valve) and FIG. 10 (opened valve) and is made up of a valve body 13 with a preferably cylindrical axial hole 23, crossing it completely. This axial hole 23 has a narrowing 33 in its forward end.

There is a ring-shaped butt 43 concentric and tight inside the valve body 13.

Axially to the valve body 13, there is a controlling stem 63, so that the forward end projects tightly through narrowing 33 of said valve body 13. This controlling stem 63 has a substantially axial hole 113 (it may be also skew) beginning in its outer end (left end) and deviating cross-sectionally to said stem in an intermediate zone to present an opening 183 inside the valve body 13.

The diameter of the controlling stem 63 inside the valve is a little greater than the diameter of the portion passing through narrowing 33, but lower than the inner diameter of the ring-shaped butt 43, a flow distribution chamber 143 being thus defined and released by opening 183 of hole 113 of the controlling stem. Alternatively, a controlling stem with a substantially uniform diameter in its whole length may be considered, but equipped with ribs in its inner zone with respect to the valve, so that its accidental axial displacement may be avoided.

Between the inner forward part of valve body 13 and the forward part of the ring-shaped butt 43, a first ring-shaped chamber is generated acting as seat for a sealing ring 83 (or forward sealing ring), which is radially adjusted to the controlling stem 63. Between the rear part of the ring-shaped butt 43 and a part of the rear butt 153 equipped with an eccentric opening 163, a second ring-shaped chamber acting as seat for an elastic ring 133 (or rear elastic ring) is generated and radially adjusted to the rear end of the controlling stem 63.

The fourth modality depicted in FIG. 11 (closed valve) and FIG. 12 (open valve) functionally behaviors in a similar way to the third modality, but with a more compact constitution. Due to its structure, the valve of this morality is suitable to be manufactured in such polymers as polypropylene or a similar one.

The valve of this modality is made up of just two parts and one elastic ring.

A first part constituting the valve of the fourth modality is the valve body 14, which has a substantially cylindrical cavity 24, opened in one of the ends of said valve body. In its closed end, this valve body 14 includes a controlling stem 64 axially projecting both to the inside of cavity 24 and the outside of said valve body, this controlling stem 64 being joint to the valve body 14 through a perimetric membrane 194, which is conformed in the same body. The controlling stem 64 has a skew hole 114 preferably communicating the center of its outer portion with a zone of the mantle of its inner portion, that is, the portion located in cavity 24 before the zone in which an elastic ring 134 is located.

A second part is a rear butt 154 which blocks in part the rear part of valve body 14. This rear butt 154 has a flow inlet hole 164 and a projection or the ring-shaped butt 44 adjusted in cavity 24 of valve body 14, thus defining a forward ring-shaped chamber which acts as seat for the elastic ring 114, this being radially adjusted in the mantle of the inner portion of the controlling stem 64.

With the valve balanced, that is, closed as shown in FIG. 11, the flow enters through opening 164 of the rear butt 154, said flow being confined in chamber 144 (formed in cavity 24, between the elastic ring 134 and the rear butt 154), so that the flow may not flow out through the skew hole 114 of the controlling stem 64, since this region is watertight isolated from chamber 144.

When a skew force is applied to the outer portion of the controlling stem 64 (arrow 94), this is angularly deviated swiveling in the membrane zone 194, which is elastically strained, so that the inner end of the controlling stem 64 radially compresses a portion of the elastic ring 134, generating a port 104 in the totally opposed portion to that compressed, the flow passing through it having to be exhausted through the skew hole 114.

When the destabilizing force has ceased, the elastic nature of membrane 194 and of elastic ring 134, allows the re-establishment of the controlling stem alignment 64, and the elastic ring 134 recovers its full contact with the periphery of said stem 64.

The fifth modality of the valve, according to the invention is depicted in FIGS. 13 to 15 and consists in a perimetric distribution compound valve with a generally axial flow inlet, and several perimetric outlets, preferably radial, each one of them equipped with its corresponding valves. A controlling stem blocks all outlet valves when it is in an axial balanced position and controls the flow outlet to one of the valve outlets, as the controlling stem is angularly deviated in the direction in which one or more of the corresponding outlet valve are closed.

When this compound valve is designed with two outlets, then its structure is of the "T" type, unlike its structure when designed with several outlets, in which case the valve body is circular with outlets being perimetrically distributed.

According to FIGS. 13 to 15, this fifth modality is compounded by a preferably circular valve body 15 with several radial outlets 115 and with one preferably axial inlet 25. Each radial outlet 115 has a valve 5 as those explained in the first, third or fourth modality, or some variation of them.

Especially in FIGS. 13 to 15, two valves 5 have been depicted similar to those of the modalities already mentioned, made up of an axial stem 65 (axial with respect to the outlet 115, but radial with respect to the valve body 15), perimetrically surrounded in an intermediate point of it through an elastic ring 135, which is seated in a ring-shaped cavity, generated between the outlet 115 of the valve body 15 and an end ring-shaped butt 45 adjusted in said outlet 115. The end of each axial stem 65 receiving the controlling force is in this case that located inside the valve and each one of these ends is controlled by a driving disk 205 linked to an axial or main controlling stem 605, which is mounted on a sealing ting with radial contact 85 that prevents the leak of the flow through narrowing or opening 35 of the valve body 15 through which said main controlling stem 605 leaves.

When a skew force is applied to the main controlling stem 605 represented by arrow 95 (see FIG. 13 or FIG. 15), this swivels around opening 35 and the driving disk 205 deviates the corresponding axial stem 65 of the corresponding valve 5 related to one of the outlets 115, radially compressing a portion of the elastic ring 135 of said valve 5 in particular, generating a flow outlet port 105 in the totally opposed portion to said elastic ring 135. Under this condition, the rest of the driving disk 205 moves away from the remaining axial stems associated with the other valves 5, so that the corresponding outlets 115 keep closed due to the action of their elastic rings 135.

Once the deflecting force applied to the main controlling stem 605 has ceased, the elastic ring 135 associated with outlet 115 which was opened, recovers its shape aligning the corresponding axial stem 65, closing said outlet and aligning the driving disk 205, so that the compound valve becomes completely closed, as shown in FIG. 14.

In all modalities already described, it has been shown that while the controlling stem is deflected by a cross three, the valve is in an opened condition, and when said force ceases, the controlling stem automatically centers itself and the flow ;passage is blocked. In these versions, it has been also shown that the controlling stem may be destabilized in any direction.

Figure 16:
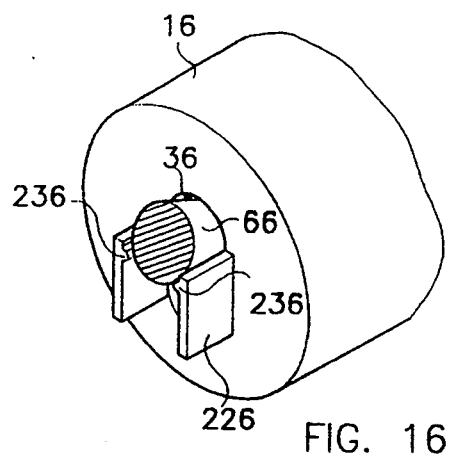
FIG. 16 depicts an isometric perspective of that portion of the valve where the controlling stem is located to show the positioning devices of the latter.

In some applications, it is advisable that the controlling stem becomes locked in the position of opened valve and, by the express application of a cross closing force, the valve becomes closed. FIG. 16 depicts the locking devices of the controlling stem outside the valve body. These locking devices make it possible to lock said controlling stem in the condition of opened valve permanently until its unlocking. Should the controlling stem be deviated in the opposed direction to that of locking, being brought beyond its center position, them the valve becomes temporarily opened, while the destabilizing force acts on said stem.

It is also advisable for certain applications to have devices limiting the direction in which the stem may be destabilized.

The preferred locking devices in this invention are shown in FIG. 16 and are made up of two fins 226 parallel and totally opposed each other, tangent to narrowing 36 of the valve body 16, through which the controlling stem 66 projects. In the inner side of each fin 226, the corresponding axial ribs 236 may be found, arranged in a direction which is coaxial to the direction of the spindle of the controlling stem when the latter is in its position of maximum deviation, so that when the controllings stem 66 is displaced (upwards in this case), it is pressed against the axial ribs 236 separating fins 226, which are elastically strained to allow said controlling stem 66 to move beyond the axial ribs 236, once their deformation has been restored which shall hold back said controlling stem in an unbalanced position, allowing the permanent passing of flow (see left section of FIG. 19). The self-centering tendency of the controlling stem due to the action of the elastic rings (not shown in FIG. 16) is not enough to strain fins 226, which shall yield under the application of an external centering force to said controlling stem.

Notwithstanding the fact that the locking devices preferred in this invention have been mentioned, they may be different; the axial ribs 236 may be replaced for example with ribs or projections, which shall perform the same function with respect to the temporary fixing of the controlling stem 66.

Figure 17:
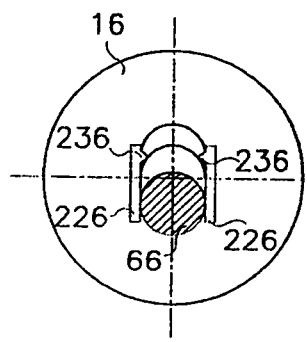
FIG. 17 shows a schematic view of the left section of the portion of the valve as the one shown in FIG. 16, depicting a lockable position of the controlling stem in one direction, displaced in a first direction without lock and under the condition of flow passing while the controlling stem is operated by hand for example.
Figure 18:
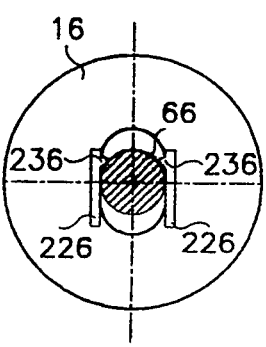
FIG. 18 is a schematic view of the same left section of the portion of the valve of FIG. 17 depicting a centered position of the controlling stem under a condition of flow stopping.
Figure 19:
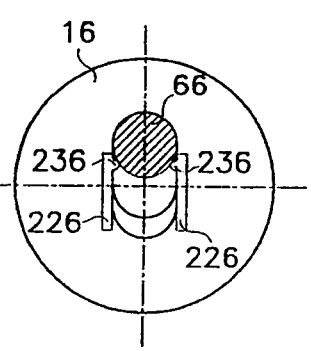
FIG. 19 is a schematic view of the same left section of the valve shown in FIGS. 17 and 18, depicting a locked position of the controlling stem in a second direction and under a condition of flow passing.

FIGS. 17 to 19 show the left section of the example depicted in FIG. 16, representing, therefore, a valve of the invention having locking devices (fins 226 and ribs 236).

FIG. 17 shows the valve in a not locked, opened condition. This condition is achieved when a cross force is downwardly applied to the controlling stem 66, that is, in a direction opposed to that in which the axial ribs 236 may be found, so that when the action of the force ceases, the valve becomes closed due to the self-centering characteristics of the controlling stem, assuming the condition depicted in FIG. 18.

Figure 20:
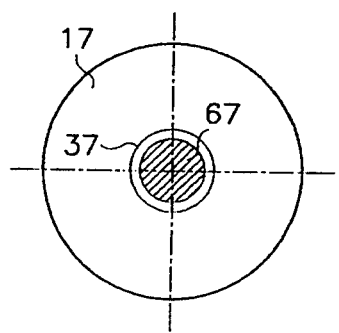
FIG. 20 is a schematic view of permanent the left section of the portion of the valve as shown in FIG. 16, depicting a self-centering position of the stem without lock, with a two-degree freedom, centered and under a condition of flow stopping.
Figure 21:
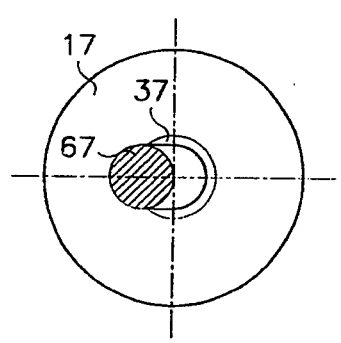
FIG. 21 is a schematic view of the same left section of the portion of the valve of FIG. 20, depicting a decentered position of the stem and under a condition of flow passing while the controlling stem is operated by hand for example.

FIG. 20 (closed valve) and FIG. 21 (opened valve) show the left section of a portion of a valve which is similar to that shown by FIG. 16, but without locking fins or ribs, in which the controlling stem 67 may be driven in any direction as shown in the modalities corresponding to FIGS. 1 to 15. To this effect, the opening or narrowing 37 of the valve body 17 has a diameter which is slightly greater than the diameter of the controlling stem 67.

Figure 22:
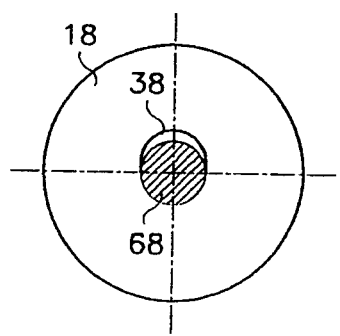
FIG. 22 is a schematic view of the left section of the portion of the valve as shown in FIG. 16, depicting a self-centering position of the stem without lock, with a one-degree freedom, centered and under a condition of flow stopping.
Figure 23:
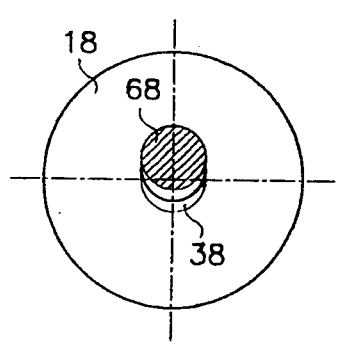
FIG. 23 is a schematic view of the same left section of the portion of the valve of FIG. 22, depicting a position of the stem under a condition of flow passing while the controlling stem is operated by hand for example.

FIGS. 22 and 23 depict the left section of the portion of a valve similar to that shown in FIG. 16, but without locking fins or ribs (FIG. 22 shows a closed valve and FIG. 23 an opened valve). The portion of the valve body 18 has a forward end opening or narrowing 38, which, unlike the previous modalities, is oblong, so that the controlling stem 68 may be displaced from its centered position just to two opposed eccentric positions (one degree freedom), each one of them without locking devices, so that the valve is temporarily opened, while some three is applied to the controlling stem 68. Depending on the application, it is obvious that opening or narrowing 38 may have a different shape from the oblong one, star-shaped for example, as the controlling stem is required to be controlled only in certain directions.

Some obvious variations of the valves already illustrated shall be considered included in this report, as well as some applications of them.

A first group of obvious variations consists in modifying the action of the controlling spindle, so that it may act through a parallel displacement to its axis, unlike the way shown for the different preceding modalities, in which the action of said controlling spindle was achieved through its angular displacement.

A group of these obvious variations may result from the installation of different drivers arranged in the free end of the controlling stem, such as flags which increase the action area of a force (pressure) to or crossly displace said controlling stem. Then, in the case of flags, the passing flow may be driven by the pressure exerted on this flag through a blowing (applicable in the case of washbasins for instance) or through the pressure exerted by the jet of some liquid (applicable in the case of urinals for instance).

Another group of obvious variations may result :from certain applications as controlling valves of other valves handling greater flows, as the case when one of the valves of the invention is installed to actuate a membrane valve, starting the pressure differential required by them to allow the passing of the flow.

An additional group of obvious variations is preferably applied to the family of modalities as depicted in FIGS. 5-8, where opening 162 of the rear butt 152 may be concentric to the body of the valve 12 and with a diameter which is smaller than the diameter of the rear end of the controlling stem.

Even another group of obvious variations associated with certain applications may be the incorporation of an external spring destabilizing the controlling stem and perform the fastening to said controlling stem in its centered position (closed valve) by some resin or wax melting down at a preset temperature, thus a valve for fire control being obtained.

These valves may be also controlled by the cross force exerted on the controlling stem by a bimetal foil deflected with temperature changes.

These and other possible variations result from such special features of these valves, such as sensitivity and compact size.

Some of the countless applications may include the pressure regulation, dosing, irrigation, sprayers, fire control systems, reservoir level control, valve control (diaphragm, piston or others), etc.

What I claim is:

1. A valve for controlling fluid flow, comprising:
   a) a body having an inlet and an outlet, said body having an opening at one end;
   b) a controlling stem disposed axially of said body with one end portion extending through said body opening, said stem being pivotable about said body opening between a normal position wherein said valve is closed and a pivoted position wherein said valve is open;
   c) a first elastic ring disposed within said body in sealing radial contact with said stem and said body and disposed between with said inlet and said outlet, thereby to prevent fluid flow from said inlet to said outlet; and
   d) said stem when in said pivoted position being adapted to deform said first elastic ring to create an opening between said stem and said first elastic ring, thereby to permit fluid to flow from said inlet through said opening to said outlet.

2. A valve as in claim 1, wherein:
   a) said inlet is a cylindrical hole;
   b) a ring-shaped butt disposed within said cylindrical hole;
   c) said butt including a rear throat; and
   d) the other end portion of said stem extends beyond said rear throat.

3. A valve as in claim 2, wherein:
   a) said butt includes a forward portion forming a ring-shaped chamber with said body; and
   b) said first elastic ring is disposed within said ring-shaped chamber.

4. A valve as in claim 1, wherein:
   a) said body opening is oblong.

5. A valve as in claim 1, wherein:
   a) said body opening has a diameter larger than the diameter of said one end portion of said stem.

6. A valve as in claim 2, wherein:
   a) the other end portion of said stem includes a flattened portion extending beyond said throat.

7. A valve as in claim 1, wherein:
   a) said one end portion of said stem is reduced in diameter;
   b) the other end portion of said stem is larger in diameter; and
   c) said body opening is smaller than the diameter of said other end portion, thereby to prevent axial movement of said stem in one direction.

8. A valve as in claim 1, wherein:
   a) a first ring-shaped butt disposed within said body forming a first ring-shaped chamber with said body;
   b) a second ring-shaped butt disposed within said body forming a second ring-shaped chamber with said body and said first butt;
   c) said first elastic ring is disposed within said second ring-shaped chamber; and
   d) a second elastic ring disposed in said first ring-shaped chamber in radial sealing contact with said stem and said body.

9. A valve as in claim 1, wherein:
   a) said outlet is disposed within said stem.

10. A valve as in claim 8, wherein:
    a) said second ring-shaped butt includes an opening communicating with said inlet.

11. A valve as in claim 1, wherein:
    a) a perimetric membrane secured to said body and said stem at said body opening, said membrane is adapted to permit pivoting of said stem; and
    b) said outlet is disposed in said stem.

12. A flow valve as in claim 1, and further comprising:
   a) a locking device operably associated with said body for locking said controlling stem in the pivoted position.

13. A flow valve as in claim 12, wherein:
   a) said locking device comprises first and second parallel fins including axial shoulders disposed on inner sides thereof corresponding to the pivoted position of said controlling stem;
   b) said controlling stem is disposed between said first and second fins; and
   c) said shoulders are adapted to permit said controlling stem to go past thereof, thereby to lock said controlling stem in the pivoted position.

14. A compound valve, comprising:
   a) a body having an inlet and first and second outlets, said body having an opening at one end;
   b) a controlling stem operably associated with said body with one end portion extending through said body opening and the other end portion disposed within said body, said stem being pivotable about said body opening between a normal position wherein said valve is closed and first and second pivoted positions in the direction of the respective first and second outlets wherein said valve is open relative to the respective outlet;
   c) a disk disposed transversely at the other end portion of said stem;
   d) a first axial stem having one end disposed below and in close proximity to said disk;
   e) a first elastic ring disposed within said body in sealing radial contact with said first axial stem and said body and disposed between with said inlet and said first outlet, thereby to prevent fluid flow from said inlet to said first outlet;
   f) a second axial stem having one end disposed below and in close proximity to said disk;
   g) a second elastic ring disposed within said body in sealing radial contact with said second axial stem and said body and disposed between said inlet and said second outlet, thereby to prevent fluid flow from said inlet to said second outlet; and
   h) said controlling stem when in one of said pivoted positions being adapted to move said disk and one of said first and second axial stems to deform the respective elastic ring to create an opening between the respective axial stem and the respective elastic ring, thereby to permit fluid to flow from said inlet through said opening to the respective outlet.

15. A compound valve as in claim 14, and further comprising:
   a) a locking device operably associated with said body for locking said controlling stem in one of said pivoted positions.

16. A compound valve as in claim 15, wherein:
   a) said locking device comprises first and second parallel fins including axial shoulders disposed on inner sides thereof corresponding to the respective pivoted position of said controlling stem;
   b) said controlling stem is disposed between said first and second fins; and
   c) said shoulders are adapted to permit said controlling stem to go past, thereby to lock said controlling stem in the pivoted position.

* * * * *